UNITED STATES PATENT OFFICE.

FRIEDRICH WILHELM HERBOLD, OF AMSTERDAM, NETHERLANDS, ASSIGNOR TO WILLI ERNST REESER, OF AMSTERDAM, NETHERLANDS.

MANUFACTURE OF ELASTIC SUBSTANCES.

1,151,948.  Specification of Letters Patent.  Patented Aug. 31, 1915.

No Drawing.   Application filed December 16, 1912.   Serial No. 737,116.

*To all whom it may concern:*

Be it known that I, FRIEDRICH WILHELM HERBOLD, subject of the Emperor of Germany, residing at No. 30 Ruysdaelstraat, Amsterdam, Netherlands, have invented certain new and useful Improvements in the Manufacture of Elastic Substances, of which the following is a specification.

The present invention has for its object the manufacture of elastic substances of rubber like properties from halogenized fatty material by treatment with sulfur. The fatty material may be any of the ordinary fats or oils and may be of either vegetable or animal origin.

According to the invention halogenized animal or vegetable oils or fats are treated at a rather high temperature with sulfur and products are thereby obtained possessing properties of a highly elastic nature and entirely similar to those of rubber, both by themselves and in admixture with rubber. For the halogenizing treatment the most suitable substances are chlorin and bromin and in some cases iodin, the halogens being allowed to act on the oils at the ordinary temperature or a moderately high temperature, either in a pure state or dissolved in inert solvents, such for instance as carbon disulfid, chloroform, etc. In this reaction the corresponding halogen hydrogen acid is formed and preferably eliminated prior to the further treatment. This removal of the acid may be effected in various ways, either by expelling it with an inert gaseous substance, such as carbon dioxid, nitrogen, etc., or by washing with water, or it may be in some cases by precipitating the halogen hydrogen acid formed, by substances forming therewith a compound insoluble in oil and separable from the halogenized oil by filtration. Where the removal of the acid is effected by precipitation substances such for instance as salts or lime or baryta or their hydrates, lead salts or other metallic compounds the haloid salts of which are insoluble in oil may be employed as precipitants.

In the improved process it has been found advantageous to dilute the oils with inert solvents, as in the first place this enables the treatment with the halogen to be carried out more readily, and secondly it also simplifies the task of eliminating the acid according to the methods referred to above. Substances adapted for use as such inert solvents are for instance carbon disulfid, chlorin compounds of aliphatic hydrocarbons, such as chloroform, carbon tetrachlorid, ethane dichlorid, ethylene tetrachlorid and the like, or benzin, benzol and equivalent substances.

The choice of the particular solvent to be used will depend on the one hand on the soluble properties of the oil employed and on the other hand on the boiling point or decomposing point of the halogenized oil obtained. After the halogenizing treatment is finished it is necessary to again expel the solvent, it may be after previously removing the halogenhydrogen acid that has been formed. The halogenized vegetable or animal oils or fats obtained in this way are then mixed with sulfur and heated to a high temperature, the sulfur being absorbed by the halogenized oil. The reaction mixture is then allowed to cool and in this way the elastic substance desired is obtained, which may in some cases be washed with water.

By way of illustrating the improved process the following examples of modes of carrying out the same will now be given.

Example 1: 15 kg. of gaseous chlorin are passed at normal temperature into 100 kg. of castor oil. As soon as the whole of the chlorin has been taken up carbonic acid gas is passed into the halogenized oil until the hydrochloric acid is expelled. 20 kg. of sulfur are then added to the chlorinated product and the mixture is vigorously stirred and heated gradually to a temperature of from 150° to 200° C. until the sulfur is entirely absorbed. This takes from one to three hours according to the temperature employed. After cooling down the elastic substance may if desired be washed in a roller machine in the usual way.

Example 2: 100 kg. of fish oil are slowly mixed with 12 kg. of bromin while the mass is being kept stirred. The resulting hydrobromic acid is washed out with water and the brominated washed product mixed with 22 kg. of sulfur. The mixture is then heated as in Example 1 and the product obtained washed with water after cooling if desired.

Other vegetable oils such as rape seed oil, linseed oil, wood oil, etc., or animal oils or fats such as fish oils, bone fats, etc., can be treated in the same way.

The products obtained by the process described are insoluble in the usual inert solvents (benzol, benzin, carbon tetra-chlorid, etc.) in a cold state and it is only after protracted boiling, kept up for several hours that a slight amount becomes dissolved. In water, alcohol and ether they are insoluble even in the presence of heat. They are characterized by high elastic properties and have great cohesion and a peculiar odor reminding one somewhat of india rubber.

The greater or less degree of elasticity of the products obtained depends on the amount of sulfur used. Where the percentage of sulfur is low the elastic character of the material predominates and where the percentage of sulfur is high products in the nature of hard rubber are formed. Furthermore, the products obtained by the process described admit of being mixed with natural rubber and solutions thereof and vulcanized in the usual manner. The products under the new process are distinguished by great powers of resistance to external influences or chemical action. Their elastic properties are not affected either by high or low temperatures. Protracted heating with moderately strong alkaline solutions does not alter the products. They are not affected by hydrochloric acid even when exposed to the action of same for a long period, and the product when in a cold state is only slightly and very gradually attacked.

In view of the rubber like nature of the products obtained by the new process they may be used in place of natural rubber either alone or in admixture with the usual inorganic or organic filling materials, such as are commonly used in the rubber industry, or it may be in admixture with rubber or solutions thereof after vulcanization.

What I claim is:

1. A process of making elastic substances which consists in first treating fatty materials with halogens and then heating with sulfur.

2. A process of making elastic substances consisting in treating fatty materials with halogens, eliminating the halogen-hydrogen acid which is formed, and then heating the halogenized fatty material with sulfur.

3. A process of making elastic substances consisting in diluting fatty materials with inert solvents, treating the diluted fatty materials with halogens, expelling the inert solvents, and then heating the halogenized fatty materials with sulfur.

4. A process of making elastic substances consisting in diluting fatty materials with inert solvents, treating the diluted fatty materials with halogens, expelling the inert solvents, eliminating the halogen-hydrogen acid which is formed, and then heating the halogenized fatty materials with sulfur.

5. A process of making elastic substances consisting in diluting fatty materials with inert solvents, treating the diluted fatty materials with halogens, expelling the inert solvents, heating the halogenized fatty materials with sulfur, and washing the resulting product.

6. A process of making elastic substances consisting in first treating fatty materials in a heated condition with halogens and then heating with sulfur.

7. A process of making elastic substances consisting in first treating fatty materials with halogens, then heating with sulfur, and vulcanizing in admixture with rubber.

8. A process of making elastic substances consisting in first treating fatty materials with halogens, then heating with sulfur, washing with water and vulcanizing in admixture with rubber.

In testimony whereof I have hereunto set my hand in presence of two subscribing witnesses.

FRIEDRICH WILHELM HERBOLD.

Witnesses:
 THOMAS H. VERHAVE,
 P. HILDERING.